UNITED STATES PATENT OFFICE.

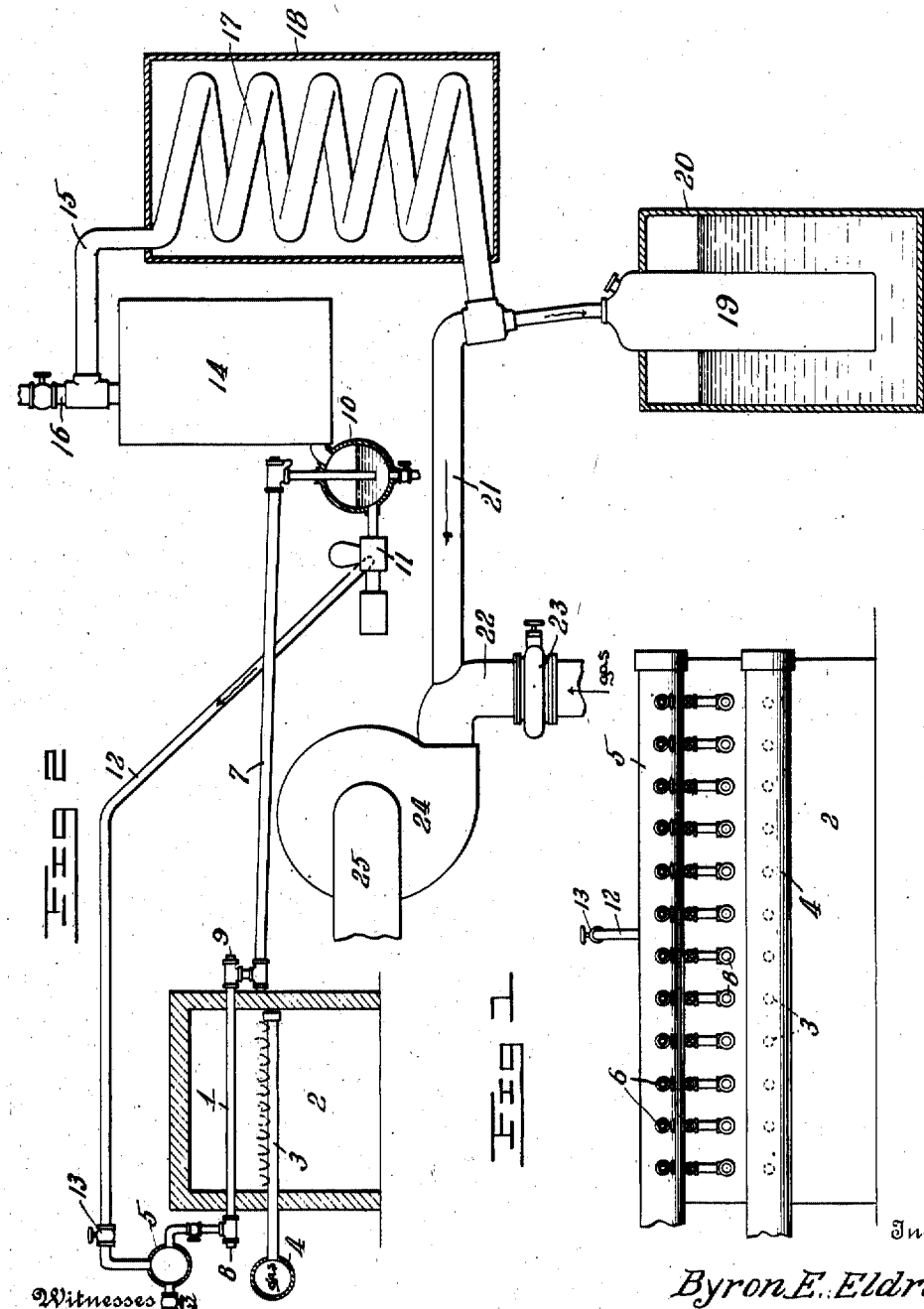

BYRON E. ELDRED AND GAIL MERSEREAU, OF NEW YORK, N. Y.

COLD-PROOF GAS AND METHOD OF MAKING THE SAME.

1,235,777.     Specification of Letters Patent.     Patented Aug. 7, 1917.

Application filed August 6, 1912, Serial No. 713,586. Renewed December 14, 1916. Serial No. 137,056.

*To all whom it may concern:*

Be it known that we, BYRON E. ELDRED and GAIL MERSEREAU, citizens of the United States, residing at New York, in the county of New York and State of New York, have invented certain new and useful Improvements in Cold-Proof Gas and Methods of Making the Same, of which the following is a specification.

This invention relates to cold-proof gas and methods of making the same; and it comprises as a new product an illuminating gas carrying relatively large amounts of olefinic gases as its main luminant constituent and susceptible of being exposed to temperatures below the freezing point of water without change of illuminating value; and it also comprises a method of producing such gas wherein high-boiling petroleum oils are exposed to a temperature around 700° C. for a time sufficient to produce a substantial amount of gasifying decomposition without so decomposing all such oil, the gas produced is cooled to remove condensable vapors and bodies, such cooling step advantageously including a chilling step to remove and recover certain diolefinic bodies, and is thereafter admixed with sufficient non-illuminating gas to bring its candle-power to a required degree; all as more fully hereinafter set forth and as claimed.

In the manufacture of illuminating gas, it is the general practice to expose the gas to a high temperature in one stage or another; and this exposure is generally in the presence of coky forms of carbon. In retort gas making from bituminous coal, the retort is full of hot coke and its walls are glowing hot. In making enriched water gas, it is the custom to make water gas, which is substantially composed of carbon monoxid and hydrogen, add oil vapors and pass the admixture through a "fixer" checker, heated to as high a temperature as may be. Oil gas is also usually passed through a highly heated "fixer." In these fixers free carbon in a coky form is always deposited. While the reactions which go forward at high temperatures in combustible gas mixtures containing hydrocarbons are many and varied, a multiplicity of synthetic and analytic reactions simultaneously occurring, yet with sufficient time and temperature the final results are always approximately the same. With temperatures of say 900° C., or higher, in the presence of coky carbon and with sufficient time to produce equilibria between the various components of a "fixed" gas, the final results are approximately definite. The final gas contains hydrogen, methane, some little ethane and a small proportion of luminants, or bodies burning with a luminous flame, while tar (that is, indefinite compounds rich in carbon and low in hydrogen) and coky carbon are also formed. The tendency is to form methane and free hydrogen with deposition of coky carbon till an equilibrium is reached. Broadly speaking, the aliphatic hydrocarbons are partly broken down into carbon and hydrogen and partly form methane with smaller amounts of other simple hydrocarbons. Among these hydrocarbons ethylene always occurs; but the amount which can remain in equilibrium with the other products in a "fixed" gas is very low; generally around 4 or 5 per cent. At temperatures above 800° C. ethylene quickly breaks down to a small "partial pressure." The carbon deposited from gas interactions at a high heat is always a hard coky variety. The decomposition of methane by heat produces a coky carbon and such carbon once produced acts as a catalytic in forming carbon from these gases with, possibly, an intermediate production of methane.

It may be said that in the customary ways of making gas from oil, whether in making oil gas alone or in enriching lean gas, it is the general effort to push the heating action as far as may be to obtain a "fixed" gas; a gas free of oils. The high heating is intended to get as much gas as possible at the expense of oils and tar. In the final gas, therefore, there is generally much methane and hydrogen while ethylene is generally reduced to about 4 or 5 per cent. Acetylene is very low. Much carbon and tar are always produced in these gas making operations.

We have discovered that a better type of gas with more economical operation can be secured by separately producing the illuminants at a lower range of temperatures without the fixing operation; and that in so producing them we can avoid waste by the formation of tar and carbon, completely utilizing our hydrocarbons.

In the course of the various high temperature reactions of gas making volatile bodies belonging to the aromatic series are synthesized, probably from acetylenic hydrocarbons, and these, together with the aromatic bodies coming from aromatic constituents naturally present in the coal or oil, being fairly resistant to high temperatures, form a large proportion of the luminants in the final "fixed" gas. These aromatic bodies, chiefly benzol, toluol, naphthalene, etc., while good luminants, have the inconvenience of easy condensability so that in cold weather the "candle power" of most city gas is apt to fluctuate.

It is an object of the present invention to produce a high candle power, chill-proof, rich gas by an operation comprising a limited breaking down of certain grades of mineral oils to produce a gas composed for the most part of the 2-carbon groups, ethylene and ethane, with minor amounts of 3-carbon and 4-carbon groups; and without production of coky carbon or tar. Such a gas containing large amounts of ethylene with some propylene and butylene, which are desirable luminants, and large amounts of ethane, which is a permanent gas rich in carbon, is very advantageous for enriching water gas, blue gas, producer gas, coal gas, etc., and for this purpose not only needs no fixing but any high heating is disadvantageous.

The first action of a heat not too high upon mineral oils is to break them down into simple molecules; to split apart the long "carbon chains" and produce simpler bodies or "shorter chains." This action, however, is usually complicated by new side reactions of the newly formed bodies with each other and with the parent substances. We have, however, found that by taking certain oils and heating for a brief time only to a temperature around 700° C., and best within 50° or 75° on either side of that temperature, we can produce a fairly smooth pyrolysis, depolymerization or "cracking" down to a gas which is mainly composed of the 2-carbon groups, ethylene and ethane. For this purpose it is best to use a crude petroleum, a petroleum residuum or a gas oil, the bulk of which boils above 150°–200° C. and, therefore, contains large amounts of hydrocarbon groups having in excess of 10 carbons in the molecule. Such oils in the present process may be broken down regularly to give the desired type of gas. This regularity of operation depends, however, upon the observance of a number of conditions. The temperature in breaking down the oil vapors should not be far from 700° C. At 650° C. under conditions otherwise correct, comparatively little of the oil breaks down to gas, though such gas as is formed is of the type here desired. At 660° to 700° the decomposition is regular; at 750° it is regular but somewhat too fast; while 800° may be termed a danger line. At 800° the gas begins to break up rapidly. But at any of these temperatures exposure of the oil vapors and gas to the heat should be brief; not over a few seconds; and there should be unchanged oil vapors remaining when heating is interrupted. The best test of time and temperature correlations is the presence of unchanged oil in the gases emerging from the heated zone; and it may be said that for safe operation to obtain the results herein desired, the oil vapors should be passed through the heated zone at such a rapid rate that a substantial quantity of heavy oil shall be recovered on air-cooling the effluent gas. It is best and safest to have heavy oil condensing out of the cooled gas to the extent of at least 10 per cent. of the amount of oil introduced into the heated zone. Of this 10 per cent. in normal operation, usually about a quarter to a half is cracked oily products with, perhaps, three quarters to a half representing original oil. The presence of unchanged oil is also desirable to shield the gas against change.

For the same object of securing a regular brief heating it is best to use relatively short, narrow tubes, gaining capacity by multiplying the number of tubes and operating them in parallel rather than by increasing the size or length of tubes. The larger the tube, the greater the amount of gas and vapor contained and the higher must be the tube temperature, in order to convey the same number of heat units per second to each cubic inch of the contained gas and vapor; the hotter must be the tube walls. And it is not desirable that these walls be above 800° C. since if any portion of the tube contents come into contact with metal hotter than, say 800° C. breaking down of the gas will result. A tube having an internal diameter of more than 1½ inches is not desirable. Inch and half inch tubes work well. With these narrow tubes, furthermore, another desirable result is secured in that stratification is substantially prevented; the effluent current of gas and vapor is substantially uniform throughout its section and vapor-free gas strata are not obtained. A heated length of 30 inches or less works well with these narrow tubes though with a feed rapid enough to send through unchanged oil vapors as much as 90 inches of heated quarter inch tube may be used and produce good gas. This gas however is different somewhat in character from that made in shorter tubes; and the latter is generally better for the present purposes.

We have found that in addition to its value as indicating the required brevity of the time-heat factor, the presence of some unchanged oil is also necessary to insure the regularity of operation. As long as some unchanged oil is present, the gas appears to be shielded or protected against breaking down; but with the disappearance of oil vapors it begins to decompose. In the presence of a substantial amount of unchanged oil vapor and in the absence of coky carbon the gas does not break down nor is tar formed; the one fact being very likely correlated with the other. Gas formed in a tube, freed of oil and sent quickly back through the tube in which it was formed is much injured.

The excess of oil passing on with the gas is, of course, collected and reintroduced so that it causes no loss.

It is a highly desirable precaution to avoid coky carbon in the sphere of action. In the presence of this variety of carbon, either because of catalytic or chemical action, the breaking down of the oil vapor becomes irregular and even under otherwise safe temperatures and conditions, carbon and tar will form and the gas will break down. If such coky carbon forms, the operation must be interrupted to remove it. In normal operation neither coky carbon nor tar forms; the oil is completely converted into gas without waste.

With normal operation the gas issuing from the heated zone should be foggy and white and have no more than a faint indication of yellow. A brown color indicates tar and irregular operation.

Gas so made is substantially permanent, the unchanged oil condensing on cooling to air temperatures taking with it condensable volatile bodies. It usually contains 45 to 50 per cent. olefins (mainly ethylene with some propylene and minor amounts of butylene) 4 or 5 per cent. of diolefinic bodies, 4 or 5 per cent. acetylenic bodies, and a residue which is mainly ethane. The olefins and the acetylenic gases are high in illuminating value and are permanent gases at low temperatures; and the ethane is also a rich gas. The diolefinic bodies are valuable as solvents and for other purposes, and it is desirable to recover them. This may be done by chilling the gas to 0° C. or lower, by any suitable means. Chilling to —15 or —20 is desirable in practice. This chilling has the advantage of rendering the gas chill-proof; no further cooling in use will affect it; while its illuminating value is also somewhat bettered. The chilled gas may be washed with chilled oil to recover a little more diolefins.

While gas so made may be used directly for lighting and power, or stored in compressed form in tanks for use with special burners, we regard it as best adapted for making a compound cold or chill-proof gas by admixture with non-illuminating gas free from condensable ingredients, such as water gas, producer gas, "blue gas", etc. These gases are made at high temperatures and do not ordinarily carry any substantial amount of condensable bodies. Should benzol and the like occur to any amount they rank as illuminating gases and are not well suited for the present purposes unless washed with oil or cooled to remove condensable bodies. As benzol has commercial value, this purifying operation is often worth while.

To make a 20–22 candle compound chill-proof gas, about 10–20 volumes of the present gas may be mixed with, say 90–80 volumes of water gas.

The heating of the oil vapors to the required temperature for the required time may be done in any suitable way and by any suitable source of heat. It is merely required that the heating be brief, be uniform and that no stratification of oil vapors and gas be produced. Oil vapors are much heavier than the gas produced, and if stratification occurs there is danger of the gas being heated in the absence of oil. Gas heating, fire heating, electric heating, etc., may be resorted to. Heating may be internal or external. The heating apparatus may be of any shape or design, but in order to avoid stratification and obtain uniform heating without undue temperatures at any point it is desirable that no point in the heating zone be more than an inch from the heated wall of the vapor chamber. The conditions are best fulfilled by narrow tubes, externally heated and horizontally placed, with an oil feed at one end and gas removing means at the other. These tubes may be of iron, steel, copper, nickel, terracotta, etc., but ordinary steel tubes are well suited for the present purposes. The heated length need not be great. With a heavy steel tube of half an inch internal diameter heated to a just visible red over about 6 inches of its length and having 18 to 30 inches extension beyond the heated area in which the temperature drops uniformly throughout to about 150° at the end, good results may be attained.

It is better to feed the oil directly to the tube in such a manner as to flood the feed end as this gives better results than using preformed oil vapors or spraying. Introducing oil vapors as such tends to stratification. Sprayed oil is apt to travel forward as liquid for a considerable distance and introduce irregularity of action. A flooding feed is well adapted for use with the high boiling oils contemplated in the present invention.

With a rate of feed of oil to and through a heated narrow tube not longer, say, than 30 inches, such that about 50 to 90 per cent. of the oil is depolymerized to form gas and the residue passes onward beyond the heated zone, the gas obtained will contain 50 per cent. or upward of gaseous olefins (nearly all ethylene with a little propylene and butylene), 4 or 5 per cent, diolefins, 4 or 5 per cent. gaseous acetylenic hydrocarbons and the residue mainly ethane. Practically all low boiling condensable bodies are removed by the condensing heavy oil. There is no substantial formation of carbon or tar; the portion of oil gasified is all utilized.

With a relatively long narrow tube such as 80 to 90 inches of half-inch tube, run with rapid oil feed, the gas will show about the same amount of total olefins, with the propylene and butylene increased at the expense of the ethylene, but with somewhat more diolefins. It is richer and denser; but is a good gas.

In the accompanying illustration we have shown, more or less diagrammatically, an apparatus which may be used in the present process. In this showing, Figure 1 is a front view of a bank of retorts; and Fig. 2 is a view, partly in vertical section, of such retorts and of accessory apparatus.

In this showing elements 1—1 are a bank of short narrow retort tubes mounted in heating chamber 2. As shown, the heat for each retort is provided by a gas burner 3, supplied with gas from any suitable source from main 4. These retort tubes may be about 30 inches long by 1¼ inches internal diameter and be made of heavy steel or cast iron. At one end, each of the tubes receives heavy oil from main 5, supplied from 6, and at the other it is connected with a cooling conduit 7, shown as air cooled. This conduit may be six to eight feet long. As shown, each tube is provided with caps 8 and 9 at each end by the removal of which it can be readily cleaned, as by thrusting a cleaning rod through. Means for cleaning are necessary since if coky carbon is once formed not only is the gas injured but the narrow tube usually promptly plugs up by the accumulation of such carbon. The presence of a little carbon in the condition of lampblack or soot does no harm, such carbon not having the detrimental catalytic effect of coky carbon. The air-cooled conduits communicate with an oil-main 10 where the oil condensed in air-cooling accumulates. It may be removed from time to time and returned to the oil feeding device by pump 11 through conduit 12, valved at 13. Beyond the oil main may be a scrubber, 14, or other device, for removing any entrained oil. This may be a coke tower. Unless the oil contains sulfur, in which case suitable purifiers must be inserted in the system, this simple device is all that is necessary. Gas leaves the purifier through conduit 15, having a branch 16 through which it may be directly taken to any desired point of use. If it be desirable to chill it further to recover diolefins and other condensable vapors, as it generally is, the gas may pass through coil 17 in tube 18 kept filled with chilled oil, calcium chlorid solution or other liquid capable of withstanding temperatures as low as 0° to −20° C. Condensed liquid flows down into receiver 19, which is shown as positioned in a cooling casing 20 kept filled with chilled oil, etc., while the chill-proofed gas flows to a place of use through conduit 21. This chilling is desirable since not only are the diolefins of commercial value and worth recovering but their removal enhances the stability of the gas at abnormally low temperatures and also, by increasing the proportion of olefins, increases its lighting value. Unless the original oil contained aromatic constituents, as is the case with some varieties of petroleum, the gas will not contain benzol, toluol, etc. If however aromatic constituents should exist in the oil there will be some benzol and toluol removed with the diolefins from which they may be separated by appropriate methods. If benzol and toluol exists in the gas, it is desirable that they be removed. As shown, conduit 21 is tapped into gas main 22, valved at 23, and leading from a source of production (not shown) of blue gas, water gas, or the like. This conduit discharges into rotary fan and mixer 24 whence the mixed gas or compounded gas passes through 25 to a place of use or to a gas tank.

As will be observed, the oil gas after the formation is not again exposed to high temperature; is not "fixed".

In the present embodiment of our invention we prefer to use a simple unobstructed cylindrical tube and avoid the use of catalytics such as reduced nickel, copper, cobalt, etc., since any packing or other filling devices in the tube may lead to delay in the flow of portions of gas therethrough and, thereby, to damage of the gas. And in the presence of catalytics, as noted with regard to coky carbon, the action is apt to be other than the simple depolymerization of heavy oils here desired.

Twisting a tube retort or giving it rifling grooves is useful in preventing stratification of gas and oil vapor.

The gas making operation may be under the ordinary atmospheric pressure. Small changes in pressure, either to less or to greater pressure do not much change the results.

In the case of some crude oils containing "colloidal carbon" or asphaltic constituents, some little coky carbon may develop at the point where the oil is vaporized, with a direct flooding feed of oil to the tube-retorts, but this does no harm as long as it does not extend to the portion of the tube which is hotter; the gasifying zone proper. A flooding feed of course keeps the portion of tube containing liquid oil at a temperature about the boiling point of such oil. Even at this, comparatively, low temperature an amount of, say, 2 per cent. "colloidal carbon" in the oil will tend to develop 6 to 8 per cent. coky carbon; apparently by catalytic action. With oils of this character and with a flooding feed, the heating should be so managed as to maintain the vaporizing zone distinct from the gasifying zone. As stated, if the coky carbon once reaches the gasifying zone proper, the operation becomes irregular and must be stopped to remove such carbon. With carbon-containing or asphalt-containing oils it is often simpler to have a separate vaporizing device, giving a vapor feed in lieu of an oil feed to the gasifying tube-retorts.

In lieu of chilling the gas to remove and recover diolefins, the same object may be attained by scrubbing with cold concentrated sulfuric acid. This removes the diolefins (and also the acetylenes) without affecting the olefins proper.

Gas of the character here described after removal of the diolefins contains nothing condensable by cold or pressure, short of, say 40 atmospheres and 0° C. (the liquefying point of ethylene). It may therefore be compressed, stored in tanks and used for car-lighting purposes without fear of change in lighting value by any winter temperature. If the storage pressure used and the temperatures to which the gas is exposed cause partial liquefaction, the release of pressure incident to opening the container to gas-consuming devices produces immediate evaporation of the condensed products into a homogeneous gas. Even without the removal of the diolefins, on diluting the gas with water-gas or the like nothing can be liquefied by ordinary low temperatures or by pressure.

The gas made in the tube retorts by the present process after removal of the diolefins is substantially homogeneous as regards its physical character; its main components, ethylene and ethane, are both, practically speaking, permanent gases of much the same physical character and such propylene as is present is not greatly different in character. It is therefore well adapted for such storage under pressure for car lighting and for other isolated lighting installations. It has a high heating value, ordinarily between 1200 and 1400 B. T. U. per cubic foot of uncompressed gas, and a candle power ranging between 80 and 100; or higher.

What we claim is:—

1. In the manufacture of permanent illuminating gas, the process which comprises exposing heavy oil vapors for a brief time to a temperature around 700° C., interrupting the heating at a time when a portion but not substantially all of said vapors is gasified and cooling the gas to condense out residual oil vapors, and collecting the gas and admixing in an "unfixed" condition with permanent lean gas to make a compound cold proof illuminating gas.

2. In the manufacture of permanent illuminating gas, the process which comprises exposing heavy oil vapors for a brief time to a temperature around 700° C., interrupting the heating at a time when there still remains vapor of heavy condensable oils to an amount not less than 10 per cent. of the original oil, cooling the gas to condense out residual oil vapors, collecting the gas and admixing in an "unfixed" condition with permanent lean gas to make a compound cold proof illuminating gas.

3. In the manufacture of permanent illuminating gas, the process which comprises feeding heavy oil vapors through a short length of heated narrow tubing in such a manner that the vapors will acquire a temperature of about 700° C. without reaching 800° C. at any point or time, removing the gas from the tubing and quickly cooling at a time when there still remains vapor of heavy condensable oils to an amount not less than 10 per cent. of the amount of oil supplied, such cooling being sufficient to condense out said vapor, collecting the gas and admixing in an "unfixed" condition with permanent lean gas to make a compound cold proof illuminating gas.

4. In the manufacture of a permanent illuminating gas, the process which comprises passing heavy oil vapors through a short length of heated narrow tubing free from coky carbon and at a temperature around 700° C., the speed of passage and length of travel being so correlated that heating is interrupted while a substantial amount of vapors of heavy condensable oil still remains, cooling sufficiently to remove condensable vapors, collecting the gas and admixing in an "unfixed" condition with permanent lean gas to make a compound cold proof illuminating gas.

5. In the manufacture of permanent illuminating gas, the process which comprises passing heavy oil vapors through a short length of heated narrow tubing free from coky carbon and at a temperature around 700° C., the speed of passage and length of travel being so correlated that heating is interrupted while a substantial amount of vapors of heavy condensable oil still remains, cooling sufficiently to remove condensable vapors, said cooling operation comprising a chilling to around 0° to —18° C., to remove diolefins, collecting the gas and admixing in an "unfixed" condition with permanent lean gas to make a compound cold proof illuminating gas.

6. The process of making permanent gas which comprises passing heavy oil vapors through about 30 inches of narrow tubing heated to about 700° C., and free from coky carbon, at a speed sufficient to cause unchanged oil vapors to emerge in substantial amount with the resulting gas, cooling the gas to recover the condensable vapors, and admixing the gas in an "unfixed" condition with permanent lean gas to make a compound cold proof illuminating gas.

7. In the manufacture of cold proof gas, the process which comprises passing heavy oil vapors through a short length of heated narrow tubing at a temperature around 700° C. under conditions preventing any portion of said vapors attaining 800° C., the amount of vapors, the speed of passage and the temperature attained being so correlated that while a major fraction of said vapors are converted into a permanent gas there shall be a substantial amount of unchanged oil vapor persisting, quickly cooling the effluent mixture of oil vapor and gas to recover the heavy oil, then chilling the cooled gas to recover easily volatile liquids, and then admixing the so-treated gas in an "unfixed" condition with permanent combustible gases.

8. The process of making a permanent gas which comprises passing a mixture of fresh oil with oil from a later stage of the process through a short and narrow tube heated to about 700° C. at a rate sufficiently rapid to insure a large amount of condensable heavy oil vapors passing beyond, condensing out such vapors by cooling and returning the oil to aid in making the original mixture, chilling the gas to remove and recover easily volatile bodies, and admixing the so-treated gas in an "unfixed" condition with other combustible gas substantially free from condensable bodies.

9. In the manufacture of chill proof gas and diolefins, the process which comprises exposing heavy oil vapors to a temperature around 700 C. for a sufficient time to gasify a major fraction but not all of said vapors, cooling the gas and oil vapors to about air temperature to remove heavy oil, chilling the cooled gas to about 0° to —20° C. to condense and recover diolefins, and compressing the resulting gas for illuminating purposes.

10. As a new article of manufacture, a compound cold proof illuminating gas carrying permanently gaseous olefins as its main illuminating constituent, said illuminating constituent comprising ethylene to a large degree, other olefins to a very much less degree and a large but decidedly smaller amount of ethane thus forming a constituent having an illuminating value approaching 100 candles and substantially free from materials condensable at a temperature of about 0° to —20° C.

11. As a new article of manufacture, a compressed permanent illuminating gas composed mainly of ethane and permanently gaseous olefins, and sufficiently free of liquefiable accompanying substances to withstand temperatures of around 0° to —20° C. without separation of liquids, said gas having an illuminating value approaching 100 candles.

12. An illuminating gas comprising ethylene and ethane, the former predominating and the two forming the bulk of the gas, and a smaller amount of propylene and an acetylene forming the principal remaining illuminating constituents of said gas.

In testimony whereof, we affix our signatures in the presence of two subscribing witnesses.

BYRON E. ELDRED.
GAIL MERSEREAU.

Witnesses:
  JOHN A. RILEY,
  FRANK B. MAY.

It is hereby certified that Letters Patent No. 1,235,777, granted August 7, 1917, upon the application of Byron E. Eldred and Gail Mersereau, of New York, N. Y., for an improvement in "Cold-Proof Gas and Methods of Making the Same," were erroneously issued to the inventors, said Eldred and Mersereau, whereas said Letters Patent should have been issued to *Chemical Development Company, a corporation of Maine*, said corporation being owner of the entire interest in said invention, as shown by the records of assignments in this office; and that the said Letters Patent should be read with this correction therein that the same may conform to the record of the case in the Patent Office.

Signed and sealed this 4th day of September, A. D., 1917.

[SEAL.]

R. F. WHITEHEAD,
*Acting Commissioner of Patents.*

Cl. 48—211.